United States Patent
Kim et al.

(10) Patent No.: US 9,212,734 B1
(45) Date of Patent: Dec. 15, 2015

(54) TRANSMISSION SYSTEM OF HYBRID ELECTRIC VEHICLE

(71) Applicant: Hyundai Motor Company, Seoul (KR)

(72) Inventors: Baekyu Kim, Suwon-Si (KR); Sunggon Byun, Anyang-Si (KR); Hyunsup Kim, Seoul (KR); Heera Lee, Anyang-Si (KR); Insup Kim, Anyang-Si (KR); Seokjoon Kim, Yongin-Si (KR); Chulmin Ahn, Busan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/557,184

(22) Filed: Dec. 1, 2014

(30) Foreign Application Priority Data

Sep. 23, 2014 (KR) ........................ 10-2014-0126785

(51) Int. Cl.
*B60K 6/365* (2007.10)
*F16H 37/04* (2006.01)
*B60K 6/442* (2007.10)
*F16H 57/04* (2010.01)

(52) U.S. Cl.
CPC .............. *F16H 37/046* (2013.01); *B60K 6/365* (2013.01); *B60K 6/442* (2013.01); *F16H 57/0476* (2013.01); *F16H 2037/048* (2013.01); *F16H 2200/2005* (2013.01); *Y10S 903/917* (2013.01)

(58) Field of Classification Search
None
See application file for complete search history.

(56) References Cited

U.S. PATENT DOCUMENTS

| | | | |
|---|---|---|---|
| 7,189,177 B2 | 3/2007 | Takasu et al. | |
| 8,430,190 B2 | 4/2013 | Honda et al. | |
| 2006/0025263 A1* | 2/2006 | Sowul | B60K 6/365 475/5 |
| 2008/0045366 A1* | 2/2008 | Schondorf | B60K 6/365 475/5 |
| 2010/0179009 A1* | 7/2010 | Wittkopp | B60K 6/365 475/5 |
| 2012/0143422 A1* | 6/2012 | Kitahata | F16H 57/0484 701/22 |
| 2014/0296013 A1* | 10/2014 | Hata | B60K 6/365 475/5 |

FOREIGN PATENT DOCUMENTS

| | | |
|---|---|---|
| JP | 2001-221300 A | 8/2001 |
| JP | 2003-063260 A | 3/2003 |
| JP | 2007-153113 A | 6/2007 |
| KR | 10-2002-0079510 A | 10/2002 |
| KR | 10-1416420 B1 | 7/2014 |

* cited by examiner

*Primary Examiner* — Justin Holmes
(74) *Attorney, Agent, or Firm* — Morgan, Lewis & Bockius LLP

(57) ABSTRACT

A transmission system of a hybrid electric vehicle may include first and second motors/generators, a planetary gear set, a first output gear for the second motor/generator, a second output gear for an engine, an under drive first clutch, and an over drive second clutch, disposed on or coupled to an input shaft. A hollow shaft is configured at an outer circumference side of the input shaft to transmit accelerated power of the engine or power of the first motor/generator to the second output gear and an outer shaft at an outer circumference side of the hollow shaft to transmit power of the second motor/generator to the first output gear. The first and second clutches are adjacently disposed at an engine side on the input shaft, and selectively transmit each of rotational power of the input shaft and rotational power of the hollow shaft to the second output gear.

9 Claims, 4 Drawing Sheets

TRANSMISSION SYSTEM OF HYBRID ELECTRIC VEHICLE

CROSS-REFERENCE TO RELATED APPLICATION

The present application claims priority of Korean Patent Application Number 10-2014-0126785 filed on Sep. 23, 2014, the entire contents of which are incorporated herein for all purposes by this reference.

BACKGROUND OF THE INVENTION

1. Field of the Invention

The present invention relates to a transmission system of a hybrid electric vehicle, and more particularly, to a transmission system of a hybrid electric vehicle that implements an electric vehicle (EV) mode, a continuous mode, and a parallel mode of direct-coupling driving and overdrive (OD) driving.

2. Description of the Related Art

In general, a hybrid electric vehicle is a vehicle that is driven by efficiently combining two or more different types of power sources.

The hybrid electric vehicle generally uses an engine and a motor/generator, and uses as a primary power source a motor/generator having a relatively excellent low-speed torque characteristic at a low speed and uses as the primary power source an engine having a relatively excellent high-speed torque characteristic at a high speed.

As a result, the hybrid electric vehicle is excellent in fuel efficiency enhancement and reduction of exhaust gas because an operation of the engine using fossil fuel stops and the motor/generator is used at a low-speed section.

A transmission system of the hybrid electric vehicle is classified into a single-mode scheme and a multiple-mode scheme.

The single-mode scheme has an advantage that torque transmission mechanisms such as a clutch and a brake for transmission control are not required, but disadvantages that when the vehicle travels at a high speed, efficiency deteriorates, and as a result, the fuel efficiency is low and an additional torque increasing device is required to apply the single-mode scheme to large-sized vehicles.

The multiple-mode scheme has advantages that when the vehicle is driven at the high speed, the efficiency is high and torque can be designed to increase, and as a result, the multiple-mode scheme can be applied to large and medium-sized vehicles.

As a result, in recent years, the multiple-mode scheme has primarily been adopted rather than the single-mode scheme and the resulting research has been actively conducted.

The multiple-mode scheme power transmission system is configured to include a planetary gear set, a plurality of motors/generators used as the motor and the generator, a torque transmission mechanism capable of controlling rotation elements of the planetary gear set, a battery used as power sources of the motors/generators, and the like.

The multiple-mode scheme power transmission system has different operating mechanisms according to connection configurations of the planetary gear sets, the motors/generators, and the torque transmission mechanisms.

In addition, since the multiple-mode scheme power transmission system has characteristics that durability, power transmission efficiency, a size, and the like depend on the connection configurations, research and development for implementing a power transmission structure which is stronger has small power loss, and is compact has been continued in a transmission system field of the hybrid electric vehicle.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a transmission system of a hybrid electric vehicle that configures a hollow shaft that transmits accelerated power of an engine or power of a first motor/generator to a second output gear on the same shaft line as an input shaft into which power of the engine and an outer shaft transmitting power of a second motor/generator to a first output gear, and configures two clutches with the same or substantially the same size to be disposed to be adjacent to each other at the engine side to be commonly used.

The present invention has been made in an effort to provide a transmission system of a hybrid electric vehicle that positions a planetary gear set disposed on an input shaft line at a rearmost side in a transmission housing to easily fix a sun gear which is a fixation element to a rear cover and allows the rear cover to support a shaft-direction load to enable a compact configuration.

The present invention has been made in an effort to provide a transmission system of a hybrid electric vehicle that rotatably supports a first output gear on the transmission housing through a bearing that rotatably supports an outer shaft on the transmission housing and rotatably supports a second output gear on the transmission housing through a bearing disposed inside to reduce the length of the transmission housing.

The present invention has been made in an effort to provide a transmission system of a hybrid electric vehicle that disposes a valve body and a collection tank for collecting churning oil on the tops of first and second clutches between a second motor/generator and the engine in the transmission housing to easily supply cooling oil to the second motor/generator and maximize spatial utilization, in EV driving.

Various aspects of the present invention provide a transmission system of a hybrid electric vehicle including: first and second motors/generators; a planetary gear set; a first output gear for the second motor/generator; a second output gear for an engine; an under drive first clutch; and an over drive second clutch, wherein the first and second motors/generators, the planetary gear set, the first output gear, the second output gear, the under drive first clutch, and the over drive second clutch are disposed on or coupled to an input shaft into which power of the engine is input, coaxially with the input shaft, a hollow shaft is configured at an outer circumference side of the input shaft so as to transmit accelerated power of the engine or power of the first motor/generator to the second output gear and an outer shaft is configured at an outer circumference side of the hollow shaft so as to transmit power of the second motor/generator to the first output gear, and the first and second clutches are configured with substantially the same size, are disposed at an engine side on the input shaft in a transmission housing to be adjacent to each other, and selectively transmit each of rotational power of the input shaft and rotational power of the hollow shaft to the second output gear.

On the input shaft, the first clutch, the second clutch, the second output gear, the first output gear, the second motor/ generator, the first motor/generator, and the planetary gear set may be sequentially disposed starting from the engine side.

The planetary gear set may be disposed at a rearmost opposite side of the engine on the input shaft in the transmission housing, and a sun gear of the planetary gear set may be fixed to a rear cover to operate as a fixation element. The sun gear of the planetary gear set may be spline-coupled on a fixation shaft integrally formed inside the rear cover to be fixed in a rotational direction.

One side of a planetary carrier of the planetary gear set may be rotatably supported on an outer circumference side through a ball bearing. The second output gear may be rotatably supported on the transmission housing through a bearing disposed inside. The first output gear may be rotatably supported on the transmission housing through a bearing that rotatably supports the outer shaft on the transmission housing. The hollow shaft may be simultaneously connected to a rotor of the first motor/generator together with a ring gear of the planetary gear set through a hub connected with the rotor of the first motor/generator.

A valve body and a collection tank collecting churning oil may be disposed on tops of the first and second clutches between the second motor/generator and the engine in the transmission housing.

According to various embodiments of the present invention, a hollow shaft that transmits accelerated power of an engine or power of a first motor/generator on the same shaft line as an input shaft into which power of the engine to a second output gear and an outer shaft transmitting power of a second motor/generator to a first output gear are configured, and two clutches are configured with the same size to be disposed to be adjacent to each other to be commonly used.

The sun gear as the fixation element is fixed to the rear cover by positioning the planetary gear set disposed on the axial line of the input shaft at a rearmost side to fix to allow the rear cover to support an axial load, thereby configuring the length of the transmission system compactly.

A first output gear is rotatably supported on the transmission housing through a bearing that rotatably supports an outer shaft on the transmission housing and a second output gear is rotatably supported on the transmission housing through a bearing disposed inside to reduce the length of the transmission housing.

A valve body and a collection tank for collecting churning oil are disposed on the tops of first and second clutches between a second motor/generator and the engine in the transmission housing to efficiently supply cooling oil to the second motor/generator and maximize spatial utilization in the transmission housing, in EV driving.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE EMBODIMENTS

Figure 1:
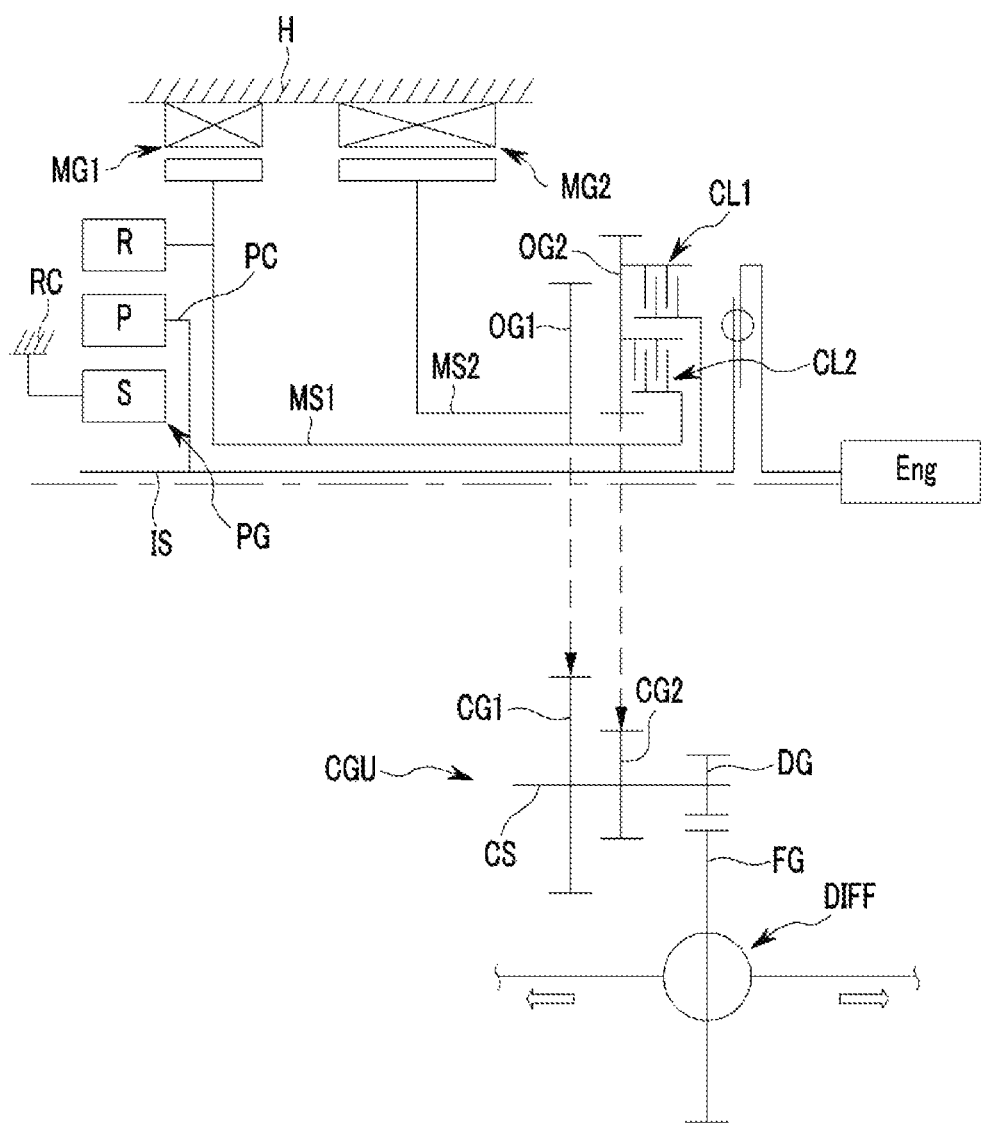
FIG. 1 is a schematic view of an exemplary transmission system of a hybrid electric vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

However, parts which are not related with the description are omitted for clearly describing various exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic view of a transmission system of a hybrid electric vehicle according to various embodiments of the present invention. Referring to FIG. 1, first, the transmission system of a hybrid electric vehicle according to various embodiments of the present invention transmits power of an engine Eng as a power source and powers of first and second motors/generators MG1 and MG2 according to a driving state of a vehicle to output the transmitted powers through first and second output gears OG1 and OG2, as illustrated in the schematic view.

The transmission system includes the first and second motors/generators MG1 and MG2, a planetary gear set PG, first and second output gears OG1 and OG2, first and second clutches CL1 and CL2, and a reduction gear unit CGU.

The first motor/generator MG1 and the second motor/generator MG2 as independent power sources have functions as a motor and a generator.

The first motor/generator MG1 may operate as a start motor that is directly connected with a ring gear R of the planetary gear set PG to drive the engine or serve as a generator that generates electricity while rotating by receiving rotational force of the engine through the ring gear R.

The second motor/generator MG2 may operate as a motor that is directly connected with the first output gear OG1 through an outer shaft MS2 to supply the rotational power.

To this end, in the first motor/generator MG1 and the second motor/generator MG2, stators are fixed to a transmission housing H, and rotors are connected to the ring gear R and the first output gear OG1 of the planetary gear set PG, respectively.

The first and second motors/generators MG1 and MG2 and the planetary gear set PG configured as above are disposed on an input shaft IS.

In this case, the first output gear OG1 operates as a gear in which an output of the second motor/generator is achieved and the second output gear OG2 operates as a gear in which an output of the engine Eng is achieved through the planetary gear set PG.

Further, the first and second clutches CL1 and CL2 may be configured by multiple-disk hydraulic friction coupling units which are friction-coupled by hydraulic pressure and are known friction members which selectively connect the rotors.

The transmission system of a hybrid electric vehicle will be described in more detail.

That is, the planetary gear set PG as a single-pinion planetary gear set includes a sun gear S, a planetary carrier PC rotatably supporting a pinion P which outer-engages with the sun gear S, and the ring gear R which inner-engages with the pinion P.

In the planetary gear set PG, the sun gear S operates as a fixation element, the planetary carrier PC is connected to the input shaft IS, and the ring gear operates as an output element and is connected to the first motor/generator MG1.

The first motor/generator MG1 is connected with the ring gear R of the planetary gear set PG to drive the ring gear R or serve as the generator, and is variably connected with the second output gear OG2 through a hollow shaft MS1.

The second motor/generator MG2 is connected with the first output gear OG1 to transmit an equal-speed output to the first output gear OG1.

The first clutch CL1 as an under drive (UD) clutch is configured between the input shaft IS and the second output gear OG2 and selectively connects the input shaft IS and the second output gear OG2 to input the rotational power of the engine Eng into the second output gear OG2 at the equal speed.

The second clutch CL2 as an over drive (OD) clutch is configured between the hollow shaft MS1 connected to the ring gear R of the planetary gear set PG and the first motor/generator and the second output gear OG2 and selectively connects the hollow shaft MS1 and the second output gear OG2, and as a result, the rotational power of the engine Eng is accelerated through the planetary gear set PG to be input into the second output gear OG2.

In addition, the first and second output gears OG1 and OG2 decelerate and transmit the rotational power to a final reduction gear FG of a differential DIFF through the reduction gear unit CGU.

In the reduction gear unit CGU, a counter shaft CS is configured between the input shaft IS and the differential DIFF in parallel to the input shaft IS, and a first counter gear CG1 is configured at one side of the counter shaft CS to outer-engage with the first output gear OG1.

Further, a second counter gear CG2 is configured, for example, at the center of the counter shaft CS to outer-engage with the second output gear OG2.

Further, a driving gear DG is configured at the other side of the counter shaft CS to outer-engage with the final reduction gear FG of the differential DIFF.

In this case, in the reduction gear unit CGU, the first and second counter gears CG1 and CG2 are configured by large-diameter gears having a larger diameter than the driving gear DG to decelerate the rotational power of the first and second output gears OG1 and OG2 and transmit the decelerated rotational power to the final reduction gear FG.

The transmission system of a hybrid electric vehicle configured as above may implement an EV mode, a continuous mode, and a drive mode constituted by direct-coupling driving and OD driving of a parallel mode.

That is, in the EV mode and the continuous mode, the first and second clutches CL1 and CL2 disengage from each other, and in the direct-coupling driving of the parallel mode, the first clutch CL1 operates and in the OD driving of the parallel mode, the second clutch CL2 operates.

In this case, the direct-coupling driving of the parallel mode may implement an under drive (UD), 1:1, and an over drive (OD) according to gear ratios of the first and second counter gears CG1 and CG2 and the driving gear DG of the reduction gear unit CGU that engages with the output gear OG.

In various embodiments, the EV mode is achieved without engagement of the clutch. In the EV mode, a stop state of the engine Eng is maintained, the planetary gear set PG is not directly correlated with the transmission, and electronic continuously variable transmission is performed by the output of the second motor/generator MG2 output to the first output gear OG1 at the equal speed. That is, the rotational power is transmitted to the final reduction gear FG of the differential DIFF through the outer shaft MS2, the first output gear OG1, the first counter gear CG1, and the driving gear DG by driving the second motor/generator MG2.

Even for the continuous mode, the direct coupling is achieved without engagement of the clutch. In the continuous mode, the engine Eng is driven in the EV mode to supply generated electricity of the first motor/generator MG1 as drive power of the second motor/generator MG2. In this case, the engine Eng is started by the first motor/generator MG1.

That is, when the first motor/generator MG1 operates, and as a result, an input into the ring gear R of the planetary gear set PG is performed, the sun gear S operates as the fixation element, and as a result, a reduction output to the planetary carrier PC is performed.

Then, rotational power for starting is input into the engine Eng through the input shaft IS connected with the planetary carrier PC to start the engine Eng.

As described above, the first motor/generator MG1 does not operate after the engine Eng starts, while the rotational power of the engine Eng is accelerated and received through the ring gear R to perform power generation.

In the continuous mode, the planetary gear set PG is not directly correlated with the transmission and the electronic continuously variable transmission is achieved by the output of the second motor/generator MG2. In this case, the planetary gear set PG is correlated with only the starting of the engine Eng and the power generation of the first motor/generator MG1. That is, in the continuous mode, the equal-speed output to the first output gear OG1 is performed while the second motor/generator MG2 operates, like the EV mode.

Then, the rotational power of the second motor/generator MG2 is transmitted to the final reduction gear FG of the differential DIFF through the outer shaft MS2, the first output gear OG1, the first counter gear CG1, and the driving gear DG.

In this case, the generated electricity in the first motor/generator MG1 is used as the driving power of the second motor/generator MG2 and residual electricity is charged in a battery.

In addition, the first clutch CL1 operates in the direct-coupling driving of the parallel mode. In the direct-coupling driving of the parallel mode, the rotational power of the engine Eng is applied as main power and the rotational power of the second motor/generator MG2 is applied as sub power.

That is, the rotational power of the engine Eng is transmitted to the second output gear OG2 through the input shaft IS as the equal-speed main power by the operation of the first clutch CL1 and simultaneously, the rotational power of the second motor/generator MG2 is transmitted to the first output gear OG1 as the equal-speed sub power. In this case, the rotational power of the engine Eng may be correlated with the power generation of the first motor/generator while torque remains.

In the direct-coupling driving of the parallel mode, the planetary gear set PG is not directly correlated with the transmission and the transmission is achieved by a direct-coupling output of the engine Eng transmitted to the second output gear OG2 through the input shaft IS as the main power and the equal-speed output of the second motor/generator MG2 transmitted to the outer shaft MS2 and the first output gear OG1 through the second planetary gear set PG2 as the sub power.

As described above, the rotational power of the engine Eng and the second motor/generator MG2 input into the first and second output gears OG1 and OG2 is transmitted to the final reduction gear FG of the differential DIFF through the first and second counter gears CG1 and CG2 and the driving gear DG.

In addition, the second clutch CL2 operates in the OD driving of the parallel mode. In the OD driving of the parallel mode, the rotational power of the engine Eng is applied as the main power and the rotational power of the second motor/generator MG2 is applied as the sub power.

That is, when the rotational power of the engine Eng is input into the planetary carrier PC of the planetary gear set PG through the input shaft IS by the operation of the second clutch CL2, the sun gear S operates as the fixation element and the rotational power is transmitted to the second output gear OG2 through the ring gear R as accelerated main power. Simultaneously, the rotational power of the second motor/generator MG2 is transmitted to the first output gear OG1 as the equal-speed sub power. In this case, the rotational power of the engine Eng may be correlated with the power generation of the first motor/generator while the torque remains.

In the OD driving of the parallel mode, the planetary gear set PG is not directly correlated with the transmission and the transmission is achieved by an accelerated output of the engine Eng transmitted to the second output gear OG2 through the input shaft IS and the planetary gear set PG as the main power and the equal-speed output of the second motor/generator MG2 transmitted to the first output gear OG1 as the sub power.

As described above, the rotational power of the engine Eng and the second motor/generator MG2 input into the first and second output gears OG1 and OG2 is transmitted to the final reduction gear FG of the differential DIFF through the first and second counter gears CG1 and CG2 and the driving gear DG.

Hereinafter, in order to aid manufacturing the transmission system of a hybrid electric vehicle, which has the schematic configuration, with a power transmission structure which is solid, low in power loss, and compact, a technical feature of a detailed configuration of the transmission system of a hybrid electric vehicle according to various embodiments of the present invention will be described.

Figure 2:
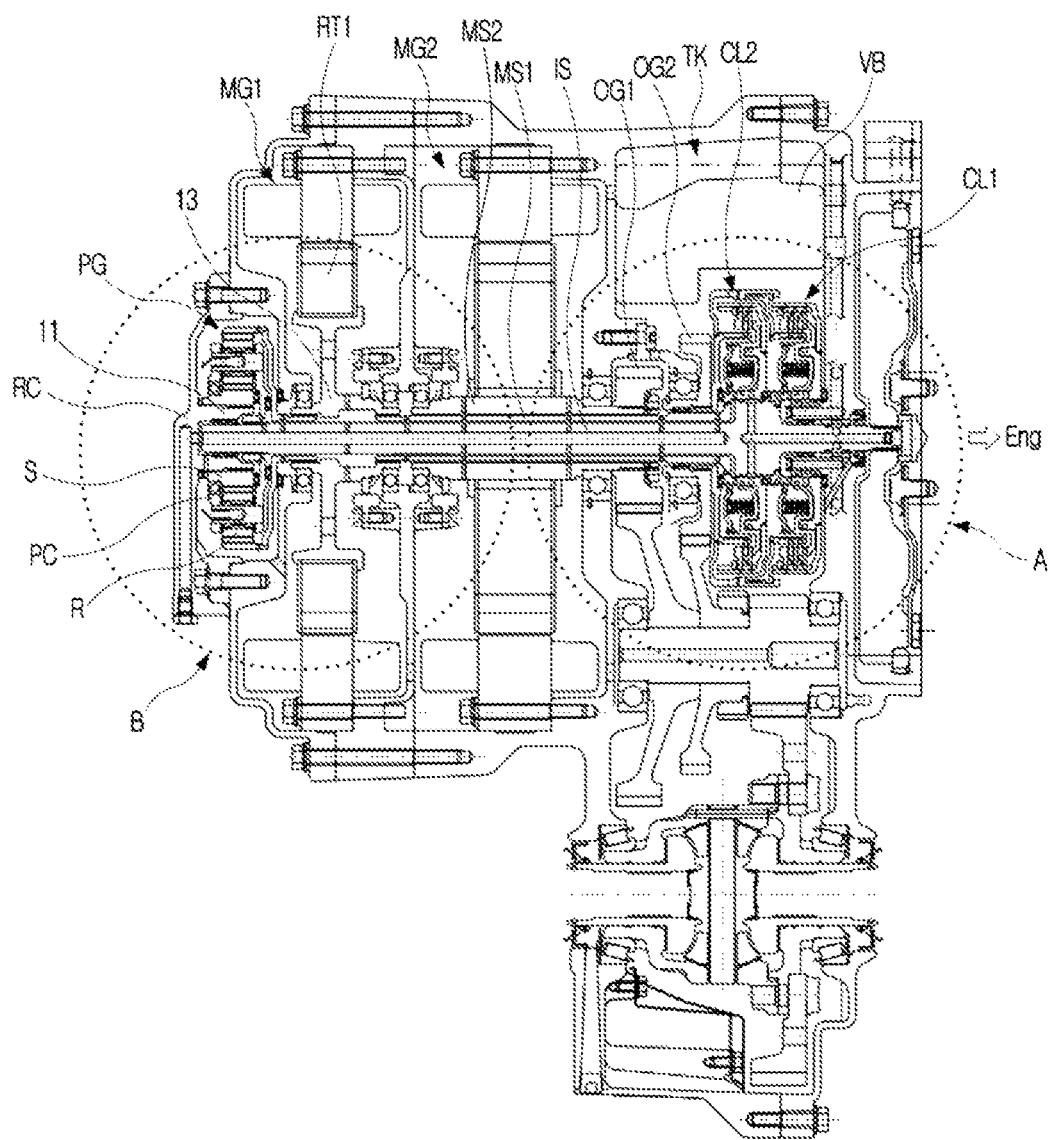
FIG. 2 is an axial exploded cross-sectional view of an exemplary transmission system of a hybrid electric vehicle according to the present invention.
Figure 3:
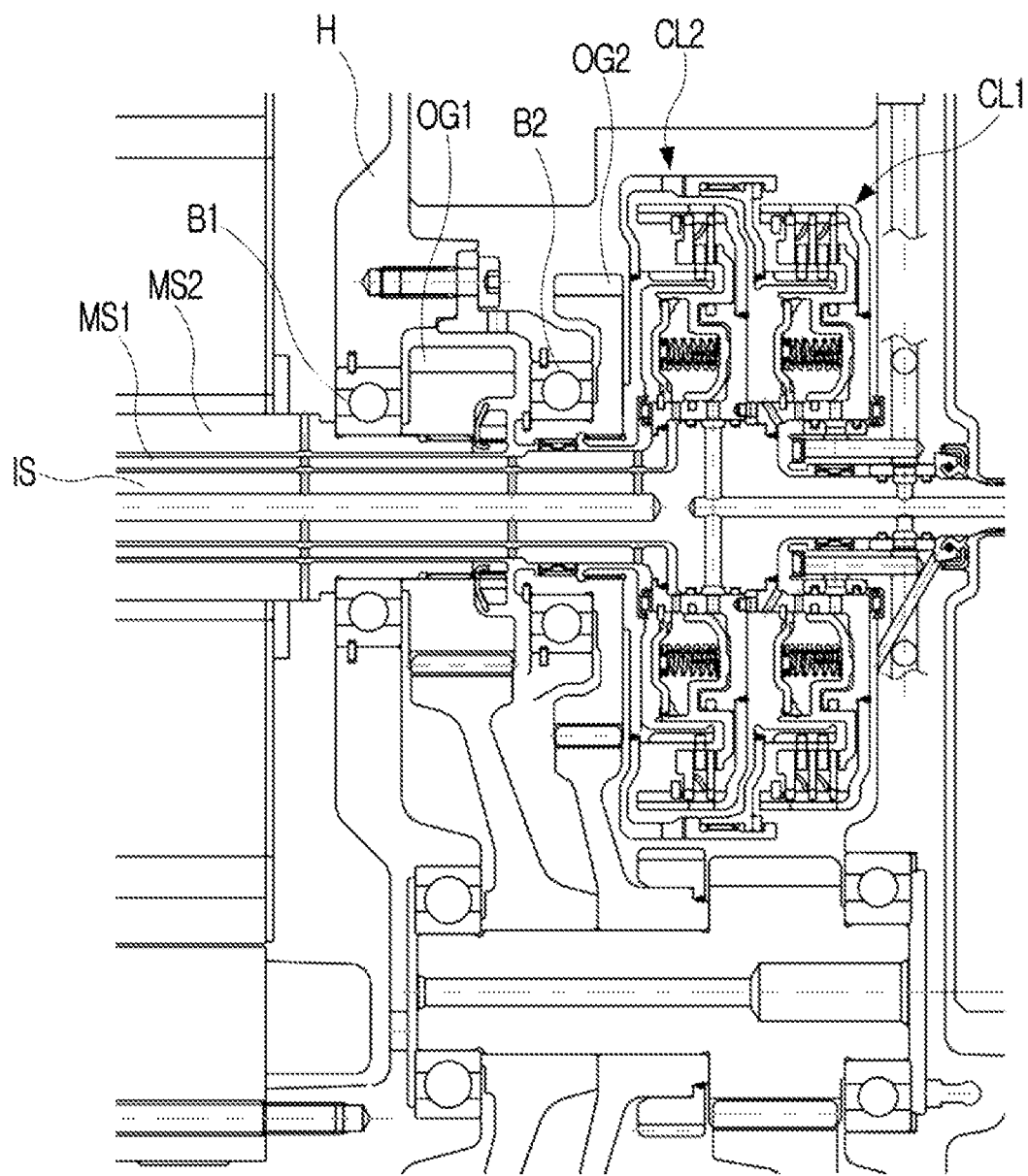
FIG. 3 is an enlarged cross-sectional view of part A of FIG. 2.
Figure 4:
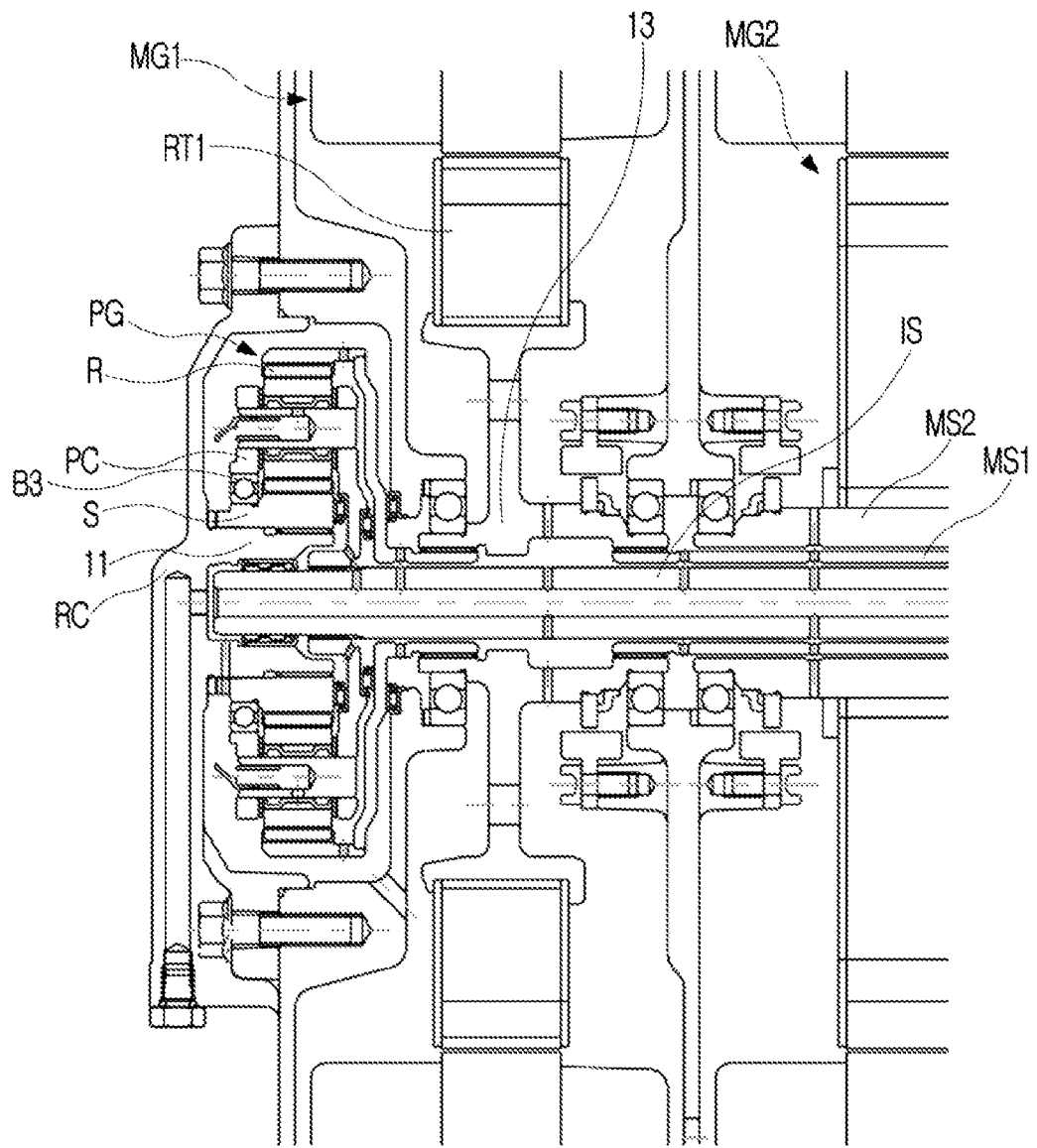
FIG. 4 is an enlarged cross-sectional view of part B of FIG. 2.

FIG. 2 is an axial exploded cross-sectional view of the transmission system of a hybrid electric vehicle according to various embodiments of the present invention. FIGS. 3 and 4 are enlarged cross-sectional views of parts A and B of FIG. 2, respectively.

Referring to FIG. 2, the transmission system of a hybrid electric vehicle according to various embodiments of the present invention includes the first and second motors/generators MG1 and MG2, the planetary gear set PG, the first output gear OG1 which is an output gear for the second motor/generator MG2, the second output gear OG2 which is an output gear for the engine Eng, the first clutch CL1 which is the under drive (UD) clutch, and the second clutch CL2 which is the over drive (OD) clutch, on the input shaft IS into which the power of the engine Eng is input.

In this case, the first clutch CL1, the second clutch CL2, the output gear OG2, the first output gear OG1, the second motor/generator MG2, the first motor/generator MG1, and the planetary gear set PG are sequentially disposed on the axial line of the input shaft IS.

Further, the hollow shaft MS1 is configured on the outer circumference of the input shaft IS so as to transmit the accelerated power of the engine Eng or the power of the first motor/generator MG1 to the second output gear OG2 and the outer shaft MS2 is configured on the outer circumference of the hollow shaft MS1 so as to transmit the power of the second motor/generator MG2 to the first output gear OG1, on the same coaxial line as the input shaft IS.

In this case, referring to FIG. 3, the first and second clutches CL1 and CL2 are configured with the same or substantially the same size and disposed on the engine Eng side on the input shaft IS in the transmission housing H to be adjacent to each other.

In this case, the first clutch CL1 has a connection configuration so as to selectively transmit the rotational power of the input shaft IS to the second output gear OG2 and the second clutch CL2 has a connection configuration so as to selectively transmit the rotational power of the hollow shaft MS1 to the second output gear OG2.

Further, the first output gear OG1 is configured to be rotatably supported on the transmission housing H through a bearing B1 that rotatably supports the outer shaft MS2 on the transmission housing H, and as a result, a separate bearing may not be added and the second output gear OG2 is configured to be rotatably supported on the transmission housing H through a bearing B2 disposed inside to reduce an overall length of the transmission housing H.

Referring to FIG. 4, the planetary gear set PG is disposed at a rearmost side of an opposite side of the engine Eng on the input shaft IS to be fixed to a rear cover RC mounted on the transmission housing H so that the sun gear S operates as the fixation element.

In this case, the sun gear S is spline-coupled to a fixation shaft 11 formed in the rear cover RC to be fixed in a rotational direction.

Further, one side of the planetary carrier PC of the planetary gear set PG is rotatably supported on an extended outer circumference of the sun gear S through a ball bearing B3.

The hollow shaft MS1 is configured to be simultaneously connected to a rotor RT1 of the first motor/generator MG1 together with the ring gear R of the planetary gear set PG through a hub 13 connected with the rotor RT1 of the first motor/generator MG1.

Referring to FIG. 2, the transmission system of a hybrid electric vehicle according to various embodiments of the present invention is configured in such a manner that a valve body VB and a collection tank TK collecting churning oil are disposed on the tops of the first and second clutches CL1 and CL2 between the second motor/generator MG2 and the engine Eng in the transmission housing H to be advantageous to supply cooling oil to the second motor/generator MG2 while increasing spatial utilization in the transmission housing H.

Accordingly, the transmission system of a hybrid electric vehicle, which has the above configuration may be commonly used by configuring each of the hollow shaft MS1 and the outer shaft MS2 on the same coaxial line as the input shaft IS into which the power of the engine Eng is input and disposing the first and second clutches CL1 and CL2 to be adjacent to each other by configuring the first and second clutches CL1 and CL2 with the same size.

The sun gear S which is the fixation element is fixed to the rear cover RC through direct-coupling by disposing the planetary gear set PG disposed on the line of the input shaft IS at the rearmost side to allow the rear cover RC to support an axial load and an overall length of the transmission housing H.

The first output gear is rotatably supported on the transmission housing through the bearing that rotatably supports the outer shaft on the transmission housing and the second output gear is rotatably supported on the transmission housing through the bearing disposed inside to further reduce the length of the transmission housing while decreasing the number of components.

The collection tank TK for collecting transmission oil depending on churning is disposed on the top of the first clutch CL1 at the engine Eng side in the transmission housing H to effectively supply the cooling oil to the second motor/generator MG2 in the EV driving and the valve body VB is disposed on the tops of the first and second clutches CL1 and CL2 between the second motor/generator MG2 and the engine Eng to maximize the spatial utilization in the transmission housing H.

For convenience in explanation and accurate definition in the appended claims, the terms "front" or "rear", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system of a hybrid electric vehicle comprising:
   first and second motors/generators;
   a planetary gear set;
   a first output gear for the second motor/generator;
   a second output gear for an engine;
   an under drive first clutch; and
   an over drive second clutch, wherein
   the first and second motors/generators, the planetary gear set, the first output gear, the second output gear, the under drive first clutch, and the over drive second clutch are disposed on or coupled to an input shaft into which power of the engine is input,
   coaxially with the input shaft, a hollow shaft is configured at an outer circumference side of the input shaft so as to transmit accelerated power of the engine or power of the first motor/generator to the second output gear and an outer shaft is configured at an outer circumference side of the hollow shaft so as to transmit power of the second motor/generator to the first output gear, and
   the first and second clutches are configured with substantially the same size, are disposed at an engine side on the input shaft in a transmission housing to be adjacent to each other, and selectively transmit each of rotational power of the input shaft and rotational power of the hollow shaft to the second output gear.

2. The system of claim 1, wherein the first clutch, the second clutch, the second output gear, the first output gear, the second motor/generator, the first motor/generator, and the planetary gear set are sequentially disposed starting from the engine side, on the input shaft.

3. The system of claim 1, wherein the planetary gear set is disposed at a rearmost opposite side of the engine on the input shaft in the transmission housing, and a sun gear of the planetary gear set is fixed to a rear cover to operate as a fixation element.

4. The system of claim 3, wherein the sun gear of the planetary gear set is spline-coupled on a fixation shaft integrally formed inside the rear cover to be fixed in a rotational direction.

5. The system of claim 3, wherein one side of a planetary carrier of the planetary gear set is rotatably supported on an outer circumference side through a ball bearing.

6. The system of claim 1, wherein the second output gear is rotatably supported on the transmission housing through a bearing disposed inside.

7. The system of claim 1, wherein the first output gear is rotatably supported on the transmission housing through a bearing that rotatably supports the outer shaft on the transmission housing.

8. The system of claim 1, wherein the hollow shaft is simultaneously connected to a rotor of the first motor/generator together with a ring gear of the planetary gear set through a hub connected with the rotor of the first motor/generator.

9. The system of claim 1, wherein a valve body and a collection tank collecting churning oil are disposed on top of the first and second clutches between the second motor/generator and the engine in the transmission housing.

* * * * *